(12) United States Patent
Norum

(10) Patent No.: US 10,291,401 B1
(45) Date of Patent: May 14, 2019

(54) STATELESS SERVICE-MEDIATED SECURITY MODULE

(71) Applicant: Amazon Technologies, Inc., Reno, NV (US)

(72) Inventor: Steven Preston Lightner Norum, Herndon, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 107 days.

(21) Appl. No.: 15/276,238

(22) Filed: Sep. 26, 2016

(51) Int. Cl.
| G06F 21/00 | (2013.01) |
| H04L 29/06 | (2006.01) |
| H04L 9/32  | (2006.01) |
| H04L 9/08  | (2006.01) |
| G06F 21/33 | (2013.01) |
| G06F 21/41 | (2013.01) |

(52) U.S. Cl.
CPC .......... *H04L 9/0866* (2013.01); *H04L 9/3247* (2013.01); *H04L 9/3265* (2013.01); *H04L 2463/121* (2013.01)

(58) Field of Classification Search
CPC ... H04L 9/0866; H04L 9/3265; H04L 9/3247; H04L 2463/121
See application file for complete search history.

(56) References Cited

U.S. PATENT DOCUMENTS 9,735,968 B2 *  8/2017  Thom ................... H04L 9/3247
2010/0241848 A1 *  9/2010  Smith ................... G01D 4/004
                                                              713/153

FOREIGN PATENT DOCUMENTS

WO   WO-2011006912 A1 *  1/2011  ............. G06F 21/33

OTHER PUBLICATIONS

Túlio Cicero Salvaro de Souza, Jean Everson Martina, Ricardo Felipe Custódio; "Audit and backup procedures for hardware security modules"; Mar. 2008; IDtrust '08: Proceedings of the 7th symposium on Identity and trust on the Internet Publisher: ACM; pp. 89-97 (Year: 2008).*

* cited by examiner

*Primary Examiner* — Kendall Dolly
*Assistant Examiner* — Courtney D Fields
(74) *Attorney, Agent, or Firm* — Hogan Lovells US LLP

(57) ABSTRACT

Secure operations can be performed using security module instances offered as a web service through a resource provider environment. State data and cryptographic material can be loaded and unloaded from the instance as needed, such that the instance can be reused for operations of different customers. The material and data can be stored as a bundle encrypted using a key specific to the hardware security module and a key specific to the resource provider, such that the bundle can only be decrypted in an instance of that type of security module from the associated manufacturer and operated by that particular resource provider. The customer is then only responsible for the allocation of that instance during the respective cryptographic operation(s).

17 Claims, 7 Drawing Sheets

STATELESS SERVICE-MEDIATED SECURITY MODULE

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In many cases the data to be processed will be secured using one or more cryptographic keys or other such security credentials. In order to ensure that these keys are not obtained by unauthorized parties, the keys are often stored in devices such as hardware security modules (HSMs). In conventional approaches, a dedicated HSM device is allocated to a customer over a period of time. Such an approach can be relatively expensive for the customer, and wasteful for the resource provider, since the customer is charged for the time that the HSM device is allocated to the customer even though the HSM device will likely be sitting idle the vast majority of the time and thus drastically underutilized.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide security module instances that can be allocated to customers on an as-needed basis. In particular, security modules in some embodiments can be allocated to customers based on requests received to web service endpoints as part of a web service offering. A resource provider can operate a number of hardware security modules (HSMs) or other such devices in a resource provider environment, and can operate one or more virtual security modules, or module instances, on each of these devices. The customer state can be loaded and unloaded to these instances as needed, such that dedicated devices do not need to be maintained for specific customers. When a request to perform an operation is received from a customer, the customer state data can be loaded to the relevant security module instance and the identity verified. Once the operation is performed, the security module instance can be released for use for another customer operation.

Various other functions can be implemented within the various embodiments as well as discussed and suggested elsewhere herein.

Figure 1:
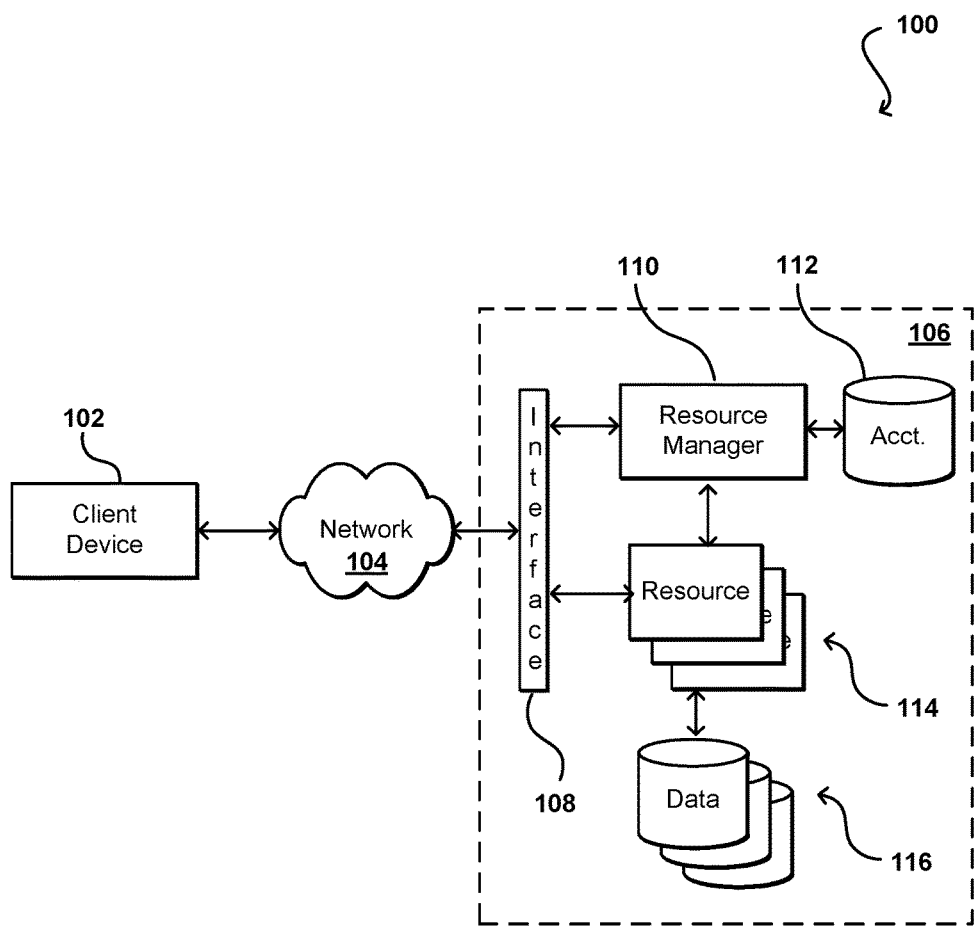
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

Figure 2:
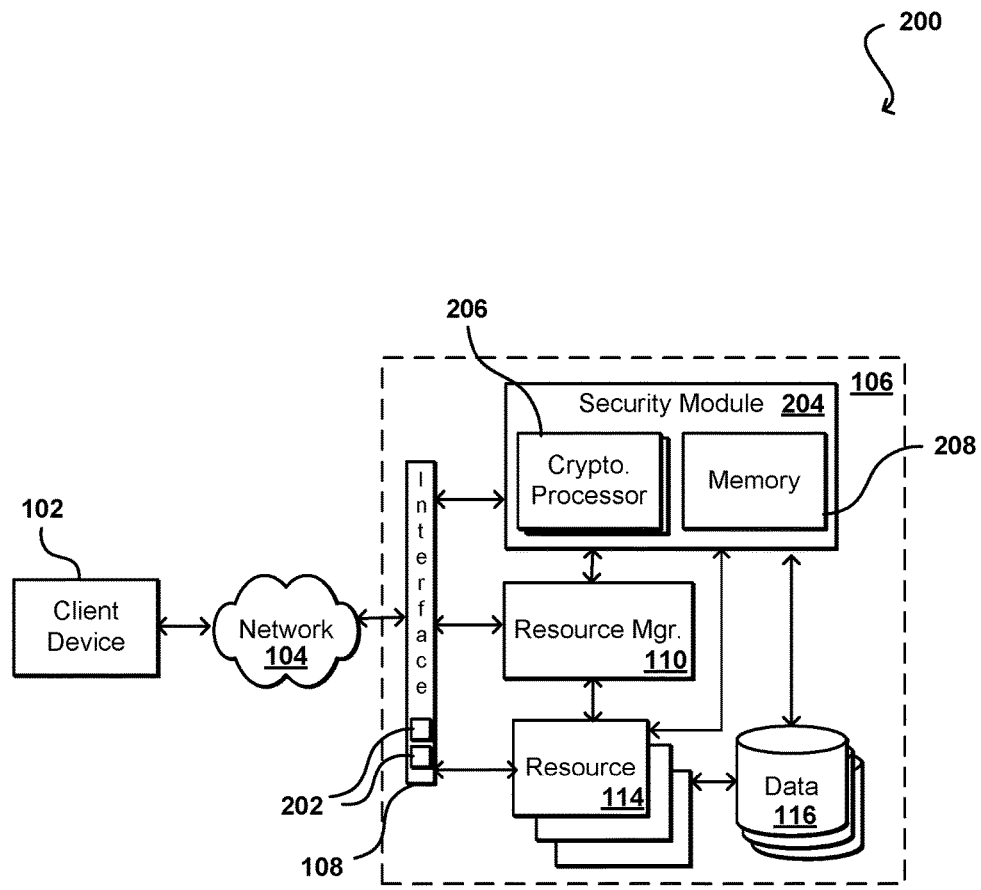
FIG. 2 illustrates a first example configuration for providing a service-based HSM that can be utilized in accordance with various embodiments.

As mentioned, a customer having an account with a provider of such an environment can cause various operations to be performed, and data to be stored, using the various resources provided through the environment. In some cases specific resources, or portions of resources, will be allocated for exclusive use by the customer, for at least a determined period of time. These can include physical resources, such as computer servers or data storage devices, or virtual resources, such as virtual machines or machine instances executing on one or more of these physical devices. As mentioned, at least some of these instances can be managed by a resource manager 110 as illustrated in the example configuration 200 of FIG. 2. It should be noted that reference numbers for similar elements may be carried over between figures for simplicity of explanation but that such usage should not be interpreted as a limitation on the scope of the various embodiments unless otherwise specifically stated.

In some embodiments the customer may want the resources to perform operations that involve various security credentials, such as one or more cryptographic keys. In some embodiments, a request can be received to an interface of the interface layer 108 and information directed to the resource manager 110, or another such system or service, that can analyze the request and determine to allocate a security module 204, such as a hardware security module (HSM), to handle the request. The HSM allocated can be an entire physical device, a portion of the device, or an instance executing on the device, among other such options. An instance allocated to the customer can function as a standalone virtual HSM instance, and can appear and function, at least from the customer perspective, as a dedicated HSM device. In other embodiments, the customer may submit a request to an application programming interface (API) 202 or other specific interface requesting use of an HSM, which can then trigger such an allocation. Various other approaches can be utilized as well within the scope of the various embodiments.

A hardware security module can be implemented through the installation of a physical computing device that includes one or more cryptographic processors 206 for performing cryptographic operations, or operations involving data encrypted using one or more cryptographic keys. In some embodiments the security module 204 can include memory 208, such as RAM or ROM, for storing cryptographic keys used to encrypt and decrypt data, as well as at least some of the data or instructions used for the operations. A security module can be implemented through a dedicated external device connected to a computer network, or can be a peripheral card or device installed on a specific computing device, among other such options. A security module instance offered to a customer can utilize all, or a portion, of the resources of the physical security module for at least a determined period of time. HSMs are generally considered to be tamper proof, such that keys stored in the HSM are considered to be unable to be extracted from the HSM by an unintended third party or system.

In one embodiment an example security module 204 includes a memory subsystem 208, including a main RAM for storage of instructions and data during program execution and a ROM in which fixed cryptographic information or program instructions may be stored, such as a root key or user private key. The security module 204 may also store keys in RAM for temporary cryptographic processing. The cryptographic information stored in the memory subsystem 204 or the one or more cryptographic processors 206 may be used to generate cryptographic keys for use with one or more virtual machines. The one or more cryptographic processors may be used to accelerate cryptographic processing in the device and may include a random number generator, RSA key generator, SHA-1 hash generator and an encryption-decryption-signature engine. User credentials of a virtual machine or guest operating system may be stored temporarily in the memory subsystem 208 for use in authentication with the service provider and/or restoring cryptographic keys. The security module may maintain key information for the one or more virtual machines, such that if the keys are deleted or encrypted during serialization the key may be restored.

A security module 204 may be a physical device connected in a data center operated by the service provider or the hardware security module may be virtualized and executed as a service of the service provider. The security module may securely store keys for one or more instances without sharing the keys with other instances or clients. In various embodiments, key management techniques are used by the security module to manage encryption keys throughout the key lifecycle (generation, secure use, storage, escrow and destruction). For example, using key management techniques, a client device 102 may effectively delete a large data set from a storage repository 116 by submitting a request to the security module 204 to destroy the key used to encrypt the data set.

The security module 204 may be logically separate from the other systems and services of the service provider to ensure confidentiality and protection of the keys. In various embodiments, the client 102 or the virtual machine instances executing on the resources 114 may store generated keys using another system or service and store the generated keys securely in the security module 204. The keys stored in the security module may only be accessed using valid credentials. The security module may validate the provided credentials using a variety of techniques and prevent access to keys by parties who have not been validated. In various embodiments, the security module 204 generates keys and performs encryption and decryption using the keys within the security module without the keys ever leaving the security module, enabling the security module to control, store and use the encryption keys without the keys being copied.

The hardware security module may also be used to restore keys during deserialization of an instance. For example, the hypervisor may provide the security module with credential information for a virtual machine instance being launched from a snapshot. If the snapshot has been encrypted by the hardware security module using a master key, the snapshot may be decrypted before launching the instance. Furthermore, if the keys inside the memory of the instance have been deleted or encrypted before serialization, the security module may restore the instance keys as well. During serialization of instances, instance data may be written to storage 116 and the security module 204 may encrypt the entirety of the instance data or just a particular area of the instance data. For example, if the instance stores all of the keying material in a particular area of memory, the security module may only encrypt that particular area of the memory.

As mentioned, however, conventional HSM-as-a-service offerings are expensive to both the customer and the resource provider. The customer is typically charged for the amount of time the HSM is allocated to the customer, regardless of the amount of time the HSM is in use. This significant underutilization also is expensive for the provider, who must install, manage, and maintain a fleet of HSMs when only a small subset of those HSMs is in use at any given time. For customers who only need rare usage, such as decrypting information only when a long-lived application is starting up, this process can be incredibly inefficient as the allocated HSM may be sitting idle over 99% of the time.

Accordingly, approaches in accordance with various embodiments can attempt to provide security modules as a service offering where a security module is only allocated to a customer on an as-needed basis, and the customer is only charged for actual usage. This can be accomplished in at least some embodiments by performing all operations within separately-authenticated, single-operation sessions. A resource provider (or service provider, etc.) can provide customer access to these security modules through an interface, such as a web service interface, on the occasions when those customers need to perform cryptographic operations. In many embodiments, virtual security modules, referred to herein as security module instances, can be allocated as with any other resource instances (e.g., virtual machine instances) using web service interfaces or other such technologies. For the security module instances, however, it can be necessary to also load and unload the cryptographic material in such a way that the material is not exposed, and is securely stored, between the allocation of security module instances on behalf of that customer. The process should also ensure that even the resource provider is unable to gain access to cryptographic material stored by the security module and otherwise unavailable to the provider.

Figure 3:
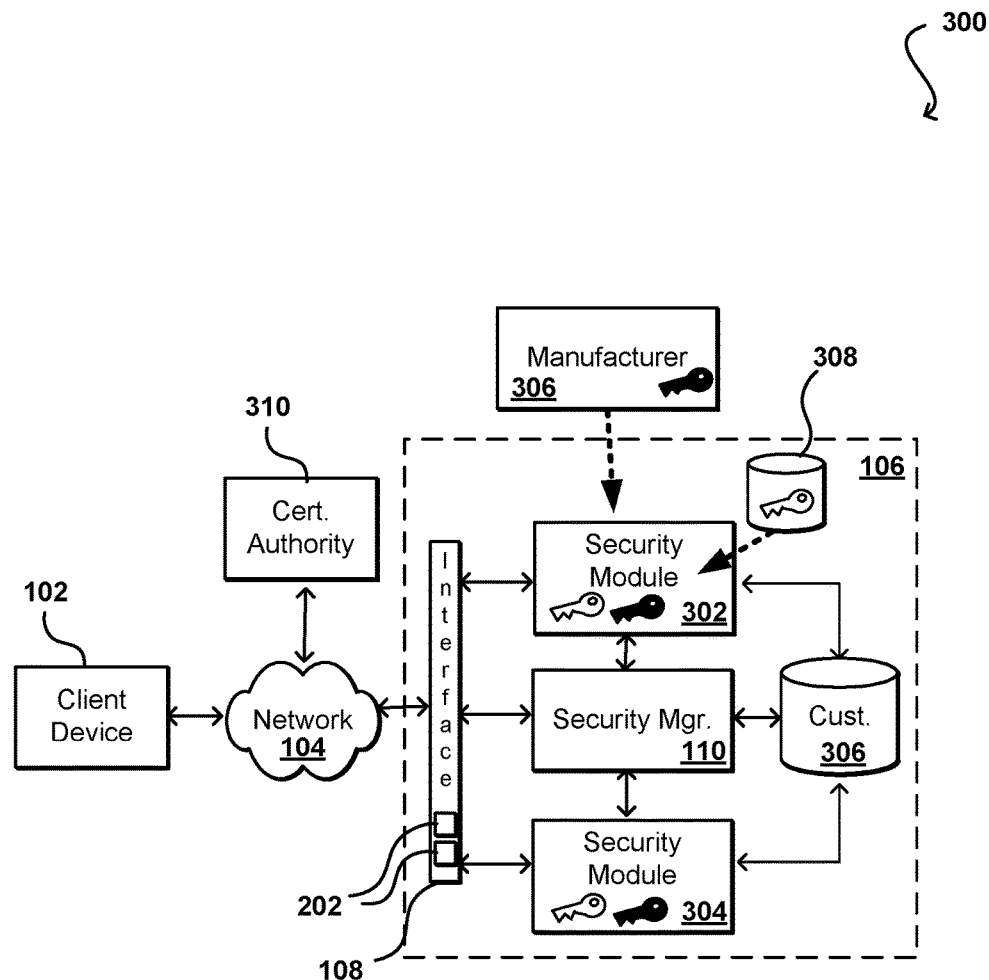
FIG. 3 illustrates a second example configuration for providing a service-based HSM that can be utilized in accordance with various embodiments.

As illustrated in the example system configuration 300 of FIG. 3, there can be multiple security modules 302, 304 or module instances, operating concurrently in the resource provider environment 106. A customer data repository 306, or other such queryable data storage, can be used to securely store data, including cryptographic keys, between allocations of any of those security modules to a specific customer. In some embodiments the security modules can be virtual modules, such that they are created and destroyed based upon allocation and usage. When a security module is being configured and/or allocated for a customer, an authentication process can occur as would occur for a dedicated HSM in at least some environments. This can include a certificate exchange in order to enable the customer to assert their identity, which can be verified for the HSM. The HSM can send back a certificate signed by a root of trust that chains back to a trusted third party, such as a public certificate authority (CA) 310. Once trust is established, the customer can utilize the virtual security module as the customer would utilize a dedicated HSM. As will be discussed in more detail later herein, the cryptographic key used to sign the certificate can be a public key associated with the resource provider, as may be stored locally in a repository 308 of the resource provider environment. This key is represented by a white key in the figures. The security modules 302, 304 can also internally store a copy of a private key provided by a third-party (represented by a black key in the figures), such as a key that is associated with a manufacturer of the physical security devices. This key is not exportable outside the HSM, such that any data encrypted under that key and stored in the resource provider environment 106 cannot be decrypted outside of an HSM from that manufacturer having that key.

When a security module instance is to no longer be allocated to a specific customer, such as when a requested operation has completed, the security module instance can take any secure customer data or objects to be retained, as may include the customer key, and encrypt the customer data with both the manufacturer key and the resource provider key. This encryption ensures that the data can only be decrypted in security module devices provided by that manufacturer and operated in the resource provider environment. The data encrypted under both keys, referred to herein as an encrypted object, can then be stored to the customer data repository 306 or another such location within the resource provider environment. Additional encryption and storage in other locations can be used as well within the scope of the various embodiments. When the customer submits or requests another operation requiring a security module, the encrypted object can be retrieved and decrypted in the appropriate security module instance using the manufacturer and resource provider keys stored to the security module instance. The loading, unloading, and security storage of cryptographic material can be performed automatically for each customer call received to an API or other such customer request.

Figure 4A:
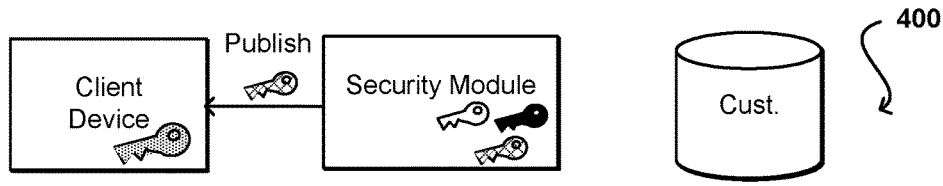
FIGS. 4A-4E illustrate an example approach to providing a service-based HSM that can be utilized in accordance with various embodiments

FIGS. 4A through 4E illustrate an example approach to key management that can be utilized in accordance with various embodiments to provide such functionality. FIG. 4A illustrates a first portion 400 of the process, wherein a security module can generate an asymmetric key pair and publish the public key, a copy of which can be provided or otherwise made available to a client device associated with a customer. The public key can be signed by a certificate, or symmetric key, hardcoded on each physical security module that chains back to a trusted root, such as the manufacturer of the physical device. The signature can demonstrate that the key was generated as part of an unexportable key pair on one of the security modules offered by the resource provider environment. The signed public key can be published and made available for all customers. The key can be periodically rotated, with a new key being generated and published. After a period of time the prior key can be deactivated and no longer accepted. The public module key is designated by the checked key in the figure.

Figure 4B:
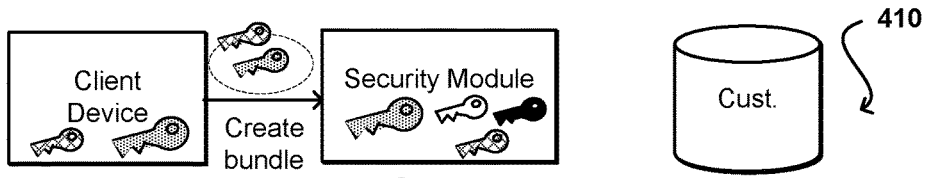

FIG. 4B illustrates a subsequent portion 410 of the process, wherein a key bundle is generated on behalf of the customer. In this example, a client device associated with a customer can submit a request to an API or other web service interface of the resource provider environment. The material for the request can be encrypted using the public module key published for the security module. The material for the request can include, for example, customer credentials such as a self-signed identity certificate (illustrated by the dotted key) for the customer's root of trust, in order to demonstrate the customer's identity. This request can be received to the API or other web service interface (not illustrated in this figure) then directed to an appropriate security module instance. The security module instance can decrypt the request using the security module key, and generate an empty key bundle. The empty key bundle in this example can take the form of a data object containing an identity certificate and a map of identifiers to cryptographic keys. The security module instance can then set the customer's identity certificate as the identity certificate of the key bundle, and encrypt the key bundle using a hardcoded encryption key that is the same among all security modules in use by this service. If an operation is to be performed, then the operation can be performed using the customer key in the security module.

Figure 4C:
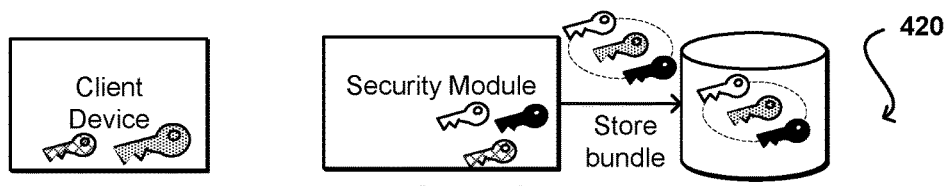

Once any operation is completed or the initial processing of the customer key bundle is performed within the appropriate security module instance, the key bundle can be encrypted under the resource provider key (white key) as well as the symmetric security key (black key) from the manufacturer chained up to a trusted root CA, as illustrated in the portion 420 of the process illustrated in FIG. 4C. The encrypted key bundle, referred to elsewhere herein as the encrypted object, can then be passed back to a web service component, which can store the encrypted object to an appropriate location. The encrypted object can be indexed by customer identifier and an auto-generated bundle identifier, among other such options. The web service can then cause the bundle identifier to be provided to the customer. The security module instance can be destroyed or otherwise reconfigured so as to be available to a different customer, or the same customer for a subsequent operation.

Figure 4D:
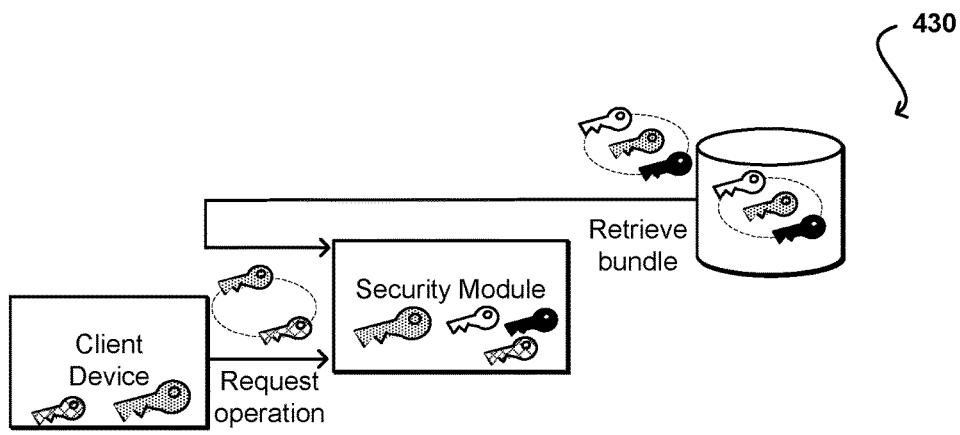
Figure 4E:
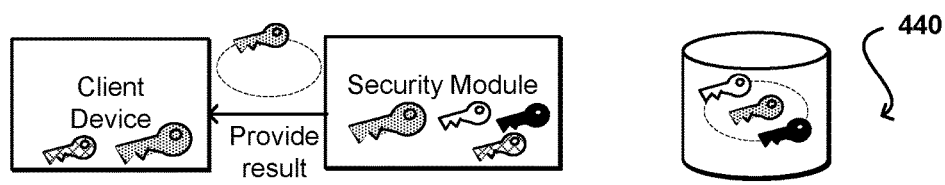

Subsequently, the customer might want to have another operation performed using a security module of the resource provider environment. A client device associated with the customer can send a request to the appropriate web service interface, or API, including material that can be signed by the customer's CA and encrypted with the most recently published public key for the security module, as illustrated in the portion 430 of FIG. 4D. The material can include information about the operation to be performed, data on which to perform the operation, a public key to be used to encrypt the result, a time stamp, and the bundle identifier used to identify the encrypted object stored in the resource provider environment. The operation can include any appropriate operation as discussed elsewhere herein, as may include encrypting or decrypting data using the included keys, as well as operations such as adding keys, generating keys, removing keys, re-encrypting the key bundle with a new identity certificate, or encrypting the contents of the bundle using a key of the customer's choosing and exporting them to be used elsewhere, among other such options. Upon the web service receiving the request, the web service can extract the bundle identifier from the request and use the identifier to retrieve the encrypted object and then pass the encrypted object to the security module instance along with the request as illustrated in FIG. 4D. Because the caller's identity is re-verified to match the owner of the key bundle on each call, multiple key bundles with different owning identities can be used by separate users in a single account. The web service can send the encrypted object and the request to an appropriate security module instance. The security module instance, now allocated to the customer, can decrypt the encrypted object using the internally stored security and provider keys to obtain the customer key bundle. The security module instance can use the relevant keys to decrypt the key bundle and the request. The security module can verify that the request is signed by the CA for the customer identity, and can perform the specified operation. This can be any appropriate operation as specified elsewhere herein, as may involve encrypting data using a specified key and encryption algorithm, etc. The security module can then encrypt the result of the operation with the customer public key specified in the call and return the encrypted result to the customer, directly or via the web service, as illustrated in the portion 440 of FIG. 4E.

Once the operation has completed and the encrypted result has been returned, the key bundle can be destroyed as a copy is already stored in the storage provider environment, encrypted under the keys as discussed with respect to FIG. 4C. If the operation causes the key bundle to be modified, or if the bundle has otherwise changed, then the security module can instead encrypt the new customer key bundle using the hardcoded encryption key for the HSMs as well as the key provided on behalf of the resource provider. The security module can send the encrypted object to the web service, which can cause the new encrypted object to be stored for the customer.

Figure 5:
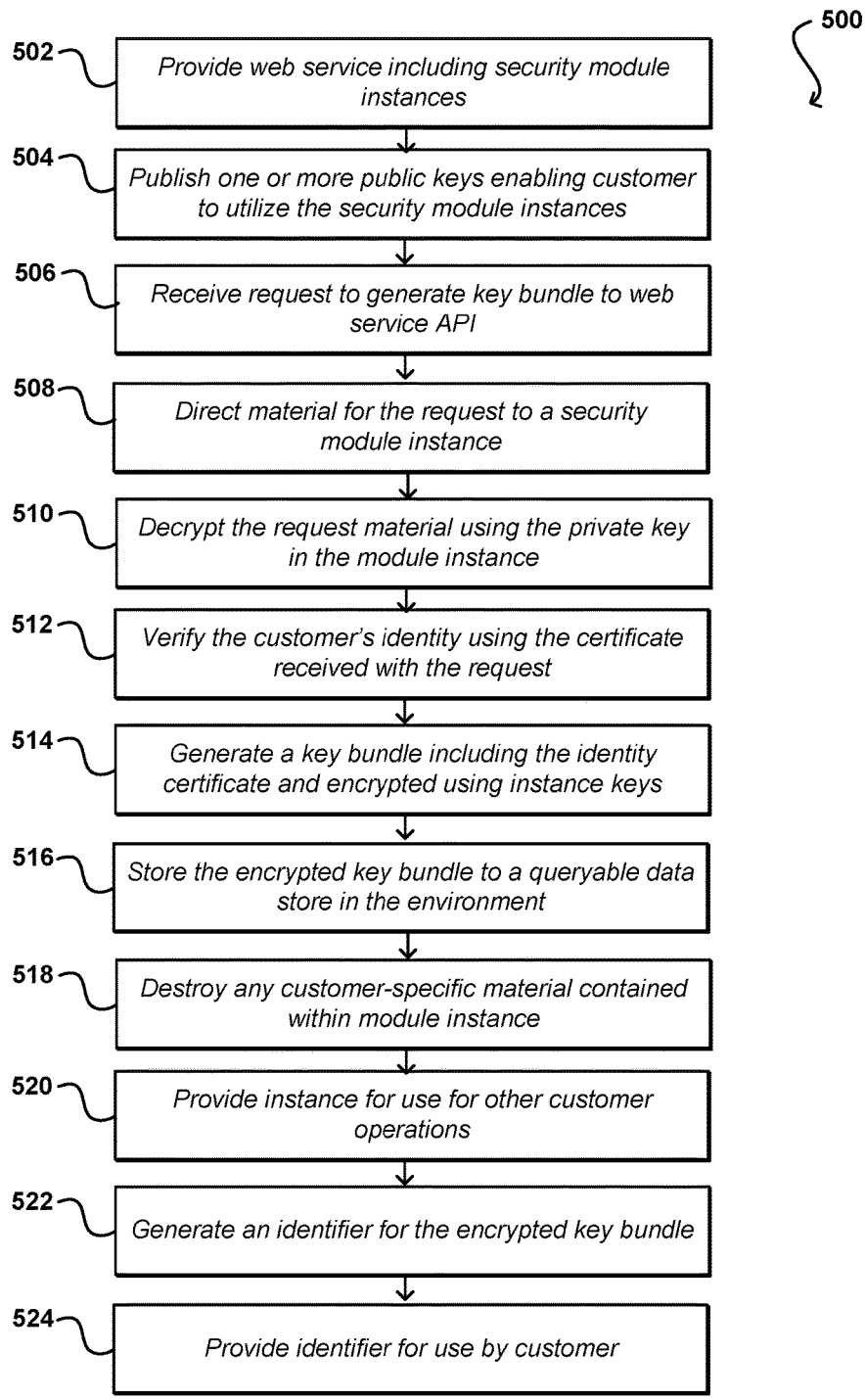
FIG. 5 illustrates an example process for allocating an initial service-based HSM to a customer that can be utilized in accordance with various embodiments.

FIG. 5 illustrates an example process 500 for configuring a security module instance on behalf of a customer that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a web service can be provided 502 that enables customers to obtain a security module instance for purposes of performing requested operations, such as to encrypt or decrypt data on behalf of a customer. A key pair is obtained that chains back to a root of trust, such as a certificate authority or a manufacturer of the HSM hardware supporting the security module instance. The public key for the service module can then be published 504 so as to be determinable by any customer wanting to utilize the service. This can include storing the key data to a flat file or sending a notification with the key data, among other such options.

A customer wanting to have a security module instance configured can generate a request, such as a generate key bundle request, that can be received 506 by a web service interface of the resource provider environment. The request can include an identifying certificate that is encrypted with the public key from the security modules. The web service can direct 508 the material for the request to one of the security module instances operated or created within the resource provider environment. The security module instance can decrypt 510 the material in the request using the keys stored in the module, and can verify 512 the customer's identity using the certificate included with the request. Once the identity is verified, a mapping of keys can be generated 514 that has the identity certificate attached and is encrypted using both the preinstalled manufacturer key and the current service provider key. The encrypted object can then be stored 516 to a location outside the security module but within the resource provider environment. Any customer-specific material on the security module instance can be destroyed 518, whether the instance itself is destroyed, reconfigured, or otherwise made available for other customers. The security module instance can then be provided 520 for use for another customer operation, whether for the same customer or a different customer. As mentioned, the customer will only be billed for the time in which the instance was allocated and/or the actual amount of processing used for the operation. The web service can generate 522 an identifier for the bundle, or encrypted object, and provide 524 this identifier for use by the customer for subsequent operations.

Figure 6:
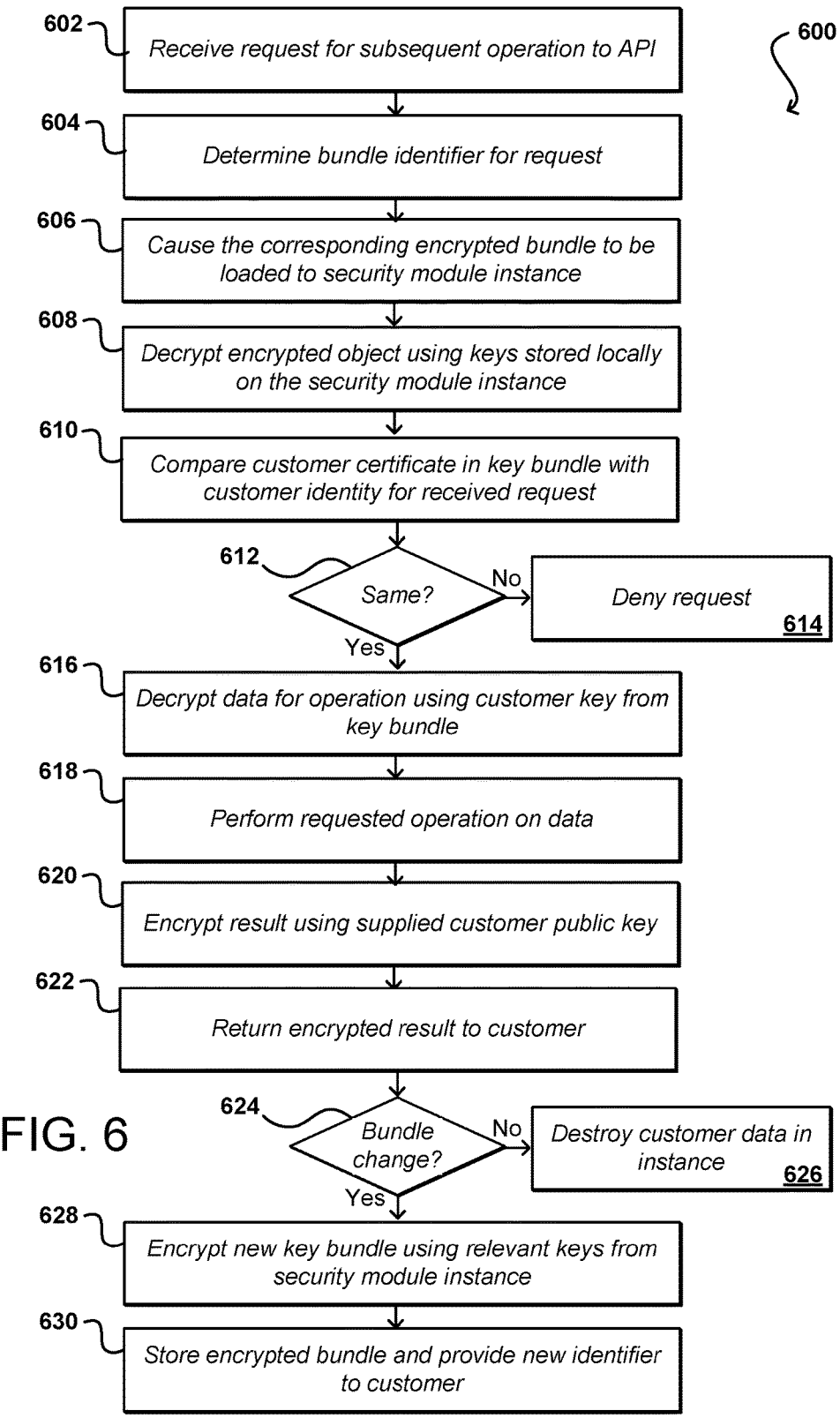
FIG. 6 illustrates an example process for allocating a subsequent service-based HSM to a customer that can be utilized in accordance with various embodiments.

FIG. 6 illustrates an example process 600 for allocating a subsequent security module instance for a customer operation that can be utilized in accordance with various embodiments. In this example, the customer wants to perform an operation that requires use of a security module instance. Accordingly, a request can be received 602 to an API, or other appropriate web service interface, that contains any data to be processed for the operation and the customer key under which the result should be encrypted for return. The web server receiving the request can determine 604 the identifier for the encrypted object associated with the customer, and can cause 606 that bundle to be loaded to a security module instance to be allocated for that customer operation. The allocated security module instance can decrypt 608 the encrypted object using the keys stored locally on the security module instance, and can verify 610 that the key bundle that was encrypted is signed by the same identity certificate associated with the request for the customer. A determination can be made 612 as to whether the key bundle corresponds to the customer having submitted the request. If not, the request to perform the operation can be denied 614. If the identities match, the data for the operation can be decrypted 616 using the customer key from the key bundle and the appropriate operation can be performed 618. The result of the operation can be encrypted 620 using the customer-provided public key and returned 622 to the customer. A determination can be made 624 as to whether the key bundle has changed from the prior bundle, such as in response to a key rotation or other such change. If not, the key bundle and any other customer-related material can be deleted 626 or destroyed from the security module instance, regardless of whether the instance itself is destroyed. If the key bundle has changed, then a new bundle can be encrypted 628 with the relevant keys and stored 630 for subsequent usage, with a new bundle identifier being provided to the customer for use for subsequent operations.

Figure 7:
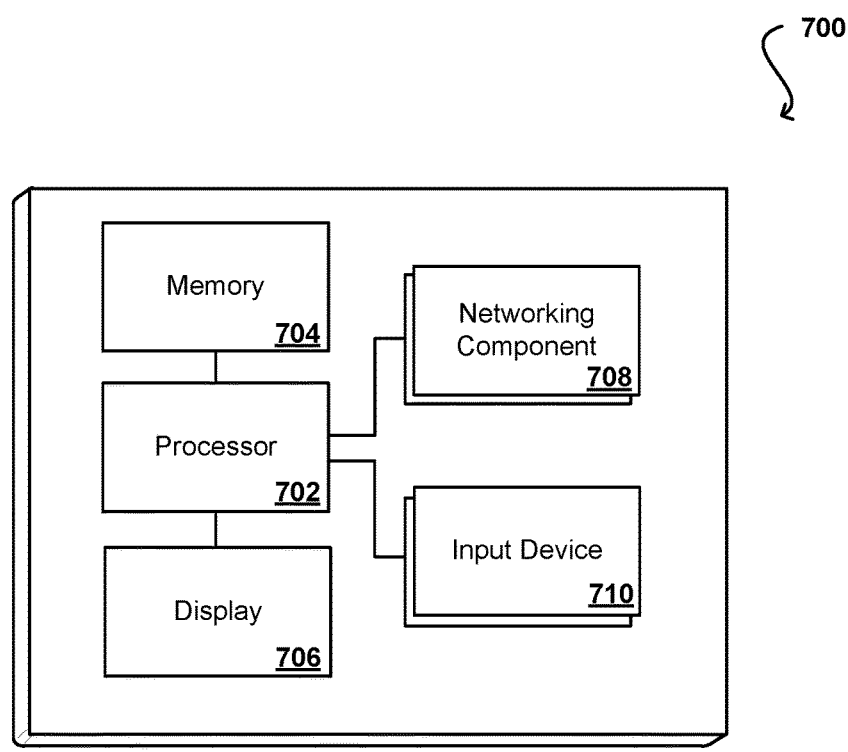
FIG. 7 illustrates example components of a computing device that can be used to implement aspects of the various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    publishing a public module key for a plurality of security module instances executing on one or more hardware security modules in a service provider environment, the public module key being part of an asymmetric cryptographic key pair signed using a security key installed by a manufacturer on each of the hardware security modules, the security key being unexportable from the hardware security modules;
    receiving, to a first application programming interface (API) of the service provider environment, a first request to enable a first customer to utilize the plurality of security module instances, the first customer having an account with a service provider corresponding to the service provider environment, the first request including a customer certificate for the first customer and being encrypted under the public module key;
    forwarding information for the first request to a first allocated security module instance having the private module key for decrypting the information for the first request;
    verifying, using the customer certificate for the first customer, an identity of the first customer;
    generating, in the first allocated security module instance, a first key bundle including the customer certificate for the first customer and a public customer key for the first customer, the first key bundle being encrypted using the security key and a provider key, the provider key being a symmetric key associated with the service provider, each of the security module instances storing the provider key;
storing the first key bundle, encrypted using the security key and the provider key, to a data store in the service provider environment;
receiving, to a second API of the service provider environment, a second request signed by the first customer for a first cryptographic operation to be performed on behalf of the first customer;
allocating a second security module instance, of the plurality of security module instances, to perform the first cryptographic operation on behalf of the first customer;
loading the first key bundle into the second security module instance, the first key bundle being decrypted in the second security model instance using the security key and the provider key;
verifying, using the customer certificate for the first customer from the first key bundle, the identity of the first customer associated with the second request;
performing the first cryptographic operation in the second security module instance;
encrypting, in the second security module instance, a result of the first cryptographic operation using at least the public customer key for the first customer;
forwarding the result to a destination associated with the first customer;
deleting any customer-specific data from the security module instance after forwarding the result;
enabling the security module instance to be allocated for cryptographic operations for any of a plurality of customers of the service provider, the plurality of customers including a second customer;
receiving a second cryptographic operation to be performed on behalf of the second customer of the service provider;
performing, using a second key bundle associated with the second customer, the second cryptographic operation in the security module instance; and
encrypting, in the security module instance, a result of the second cryptographic operation using at least a second public customer key included in the second key bundle.

2. The computer-implemented method of claim 1, further comprising:
providing a key bundle identifier associated with the first key bundle stored in the data store of the service provider environment and associated with the first customer, wherein the second request to perform the cryptographic operation includes the key bundle identifier.

3. The computer-implemented method of claim 2, further comprising:
determining, as a result of performing the first cryptographic operation for the second request, to generate a new key bundle to be associated with the first customer;
causing the new key bundle, encrypted under the security key and the provider key, to be stored to the data store in the service provider environment; and
providing a new key bundle identifier for use on behalf of the first customer.

4. A computer-implemented method, comprising:
receiving, to an interface of a service provider environment, a first request for a first cryptographic operation to be performed on behalf of a first customer of a service provider corresponding to the service provider environment;
allocating a security module instance, of a plurality of service module instances operating on one or more hardware security modules in the service provider environment, to perform the first cryptographic operation on behalf of the first customer;
loading a first key bundle associated with the first customer into the security module instance, the first key bundle including a first public customer key and a first customer certificate, the first key bundle encrypted using a security key and a provider key, the security key being a key installed onto each of the hardware security modules by a third-party other than the service provider, the security key being unexportable from the hardware security modules, the provider key being a key associated with the service provider, each of the security module instances storing the provider key;
decrypting, in the security module instance, the first key bundle using the security key and the provider key;
verifying, using the first customer certificate from the first key bundle, an identity of the first customer associated with the first request;
performing the first cryptographic operation in the security module instance;
encrypting, in the security module instance, a result of the first cryptographic operation using at least the first public customer key;
forwarding the result of the first cryptographic operation to a destination associated with the first customer;
deleting any customer-specific data from the particular allocated security module instance after storing the first key bundle;
enabling the particular allocated security module instance to be allocated for cryptographic operations for any of a plurality of customers of the service provider, the plurality of customers including a second customer;
receiving a second cryptographic operation to be performed on behalf of the second customer of the service provider;
performing, using a second key bundle associated with the second customer, the second cryptographic operation in the security module instance; and
encrypting, in the security module instance, a result of the second cryptographic operation using at least a second public customer key included in the second key bundle.

5. The computer-implemented method of claim 4, further comprising:
receiving, to the service provider environment, a prior request to enable the first customer to utilize the plurality of security module instances, the prior request including the first customer certificate and being encrypted under a public module key;
forwarding information for the prior request to a particular allocated security module instance having a private module key for decrypting the information for the prior request;
verifying, using the first customer certificate, the identity of the first customer;
generating, in the particular allocated security module instance, the first key bundle including the first customer certificate and the first public customer key; and
storing the first key bundle, encrypted using the security key and the provider key, to the data store in the service provider environment.

6. The computer-implemented method of claim 4, further comprising:
providing a key bundle identifier associated with the first key bundle stored in the data store of the service provider environment and associated with the first customer, wherein the first request to perform the first cryptographic operation includes the key bundle identifier.

7. The computer-implemented method of claim 6, further comprising:
determining, as a result of performing the first cryptographic operation, to generate a new key bundle to be associated with the first customer;
causing the new key bundle, encrypted under the security key and the provider key, to be stored to the data store in the service provider environment; and
providing a new key bundle identifier for use on behalf of the first customer.

8. The computer-implemented method of claim 6, further comprising:
submitting, to the data store, a query including the key bundle identifier in order to identify the first key bundle.

9. The computer-implemented method of claim 4, further comprising:
publishing, to a customer-accessible location, the public module key for the plurality of security module instances, the public module key generated on the plurality of security module instances and signed by a public root for the security module instances.

10. The computer-implemented method of claim 4, further comprising:
deleting any customer-specific data from the security module instance after forwarding the result of the first cryptographic operation; and
enabling the security module instance to be allocated for cryptographic operations for any of a plurality of customers of the service provider.

11. The computer-implemented method of claim 4, wherein the first cryptographic operation includes at least one of encrypting data for the first request, decrypting data for the first request, generating a new cryptographic key, removing a cryptographic key, adding a cryptographic key, re-encrypting the key bundle with a new identity certificate, signing data, or encrypting the first key bundle using a key specified by the first customer.

12. The computer-implemented method of claim 4, further comprising:
receiving the first request to an application programming interface (API) of the service provider environment, wherein the performing of first cryptographic operations on behalf of the plurality of customers is offered as a web service.

13. The computer-implemented method of claim 4, wherein the first request further includes at least one of data for the first cryptographic operation, a public key to be used to encrypt the result of the first cryptographic operation, or a time stamp for the first cryptographic operation.

14. A system, comprising:
at least one processor; and
memory including instructions that, when executed by the at least one processor, cause the system to:
receive a request for a first cryptographic operation to be performed on behalf of a first customer of a service provider corresponding to the service provider environment;
allocate a security module instance, of a plurality of service module instances operating on one or more hardware security modules in the service provider environment, to perform the first cryptographic operation on behalf of the first customer;
cause a first key bundle to be loaded into the security module instance, the first key bundle including a first public customer key and a first customer certificate, the first key bundle encrypted using a security key and a provider key, the security key being part of a third-party cryptographic key pair installed onto each of the hardware security modules by a third-party other than the service provider, a security key of the third-party cryptographic key pair being unexportable from the hardware security modules, the provider key being part of a provider key pair associated with the service provider and including a provider key, each of the security module instances storing the provider key;
cause the first key bundle to be decrypted, in the security module instance, using the security key and the provider key;
cause the identity of the first customer associated with the first request to be verified using the first customer certificate from the first key bundle;
cause the first cryptographic operation to be performed in the security module instance;
cause a result of the first cryptographic operation to be decrypted, in the security module instance, using at least the first public customer key;
forward the result of the first cryptographic operation to a destination associated with the first customer;
cause any customer-specific data to be deleted from the security module instance after forwarding the result of the first cryptographic operation;
enable the security module instance to be allocated for cryptographic operations for any of a plurality of customers of the service provider;
receive a second request for a second cryptographic operation to be performed on behalf of a second customer of the service provider;
perform, using a second key bundle associated with the second customer, the second cryptographic operation in the security module instance; and
encrypt, in the security module instance, a result of the second cryptographic operation using at least a second public customer key included in the second key bundle.

15. The system of claim 14, wherein the instructions when executed further cause the system to:
receive a prior request to enable the first customer to utilize the plurality of security module instances, the prior request including first customer certificate and being encrypted under a public module key;
forward information for the prior request to a particular allocated security module instance having a private module key for decrypting the information for the prior request;
cause the identity of the first customer to be verified using the first customer certificate;
cause the first key bundle including the first customer certificate and the first public customer key to be generated in the particular allocated security module instance; and
cause the first key bundle, encrypted using the security key and the provider key, to be stored to the data store in the service provider environment.

16. The system of claim 14, wherein the instructions when executed further cause the system to:
provide a key bundle identifier associated with the first key bundle stored in the data store of the service provider environment and associated with the first customer, wherein the request to perform the first cryptographic operation includes the key bundle identifier.

17. The system of claim 14, further comprising:
an application programming interface (API) for receiving the request for the first cryptographic operation, wherein the performing of cryptographic operations on behalf of the plurality of customers is offered as a web service.

* * * * *